(12) United States Patent
Allison, Jr. et al.

(10) Patent No.: US 8,346,661 B2
(45) Date of Patent: Jan. 1, 2013

(54) AGGREGATION OF CUSTOMER TRANSACTION DATA

(75) Inventors: Thayer S. Allison, Jr., Charlotte, NC (US); Sudeshna Banerjee, Waxhaw, NC (US); Debashis Ghosh, Charlotte, NC (US); Hemant A. Kagade, Charlotte, NC (US); Mark V. Krein, Charlotte, NC (US); David Joa, Irvine, CA (US); Kurt D. Newman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 41 days.

(21) Appl. No.: 12/730,706

(22) Filed: Mar. 24, 2010

(65) Prior Publication Data

US 2011/0238538 A1 Sep. 29, 2011

(51) Int. Cl.
*G06Q 40/00* (2012.01)
(52) U.S. Cl. ............. 705/39; 705/14.27; 705/30
(58) Field of Classification Search ............ 705/14.27, 705/30
See application file for complete search history.

(56) References Cited

U.S. PATENT DOCUMENTS

| | | | |
|---|---|---|---|
| 7,398,234 B1 * | 7/2008 | Theis et al. | 705/30 |
| 2008/0177826 A1 * | 7/2008 | Pitroda | 709/203 |
| 2009/0287562 A1 * | 11/2009 | Bosch et al. | 705/14.27 |

OTHER PUBLICATIONS

"Revere Data Launches a New Reports Marketplace: Introducing the Revere Merger & Acquisition Scenario Reports and Revere Insight Reports" New York, Mar. 20, 2006, 4 pgs (Revere1).*
"Merger and Acquisition Scenario", Revere, Mar. 21, 2009, 25 pgs (Revere2).*
Quanta Services Inc., 2007 Annual Report, 129 pgs.*

* cited by examiner

*Primary Examiner* — Ryan Zeender
*Assistant Examiner* — Hunter Wilder
(74) *Attorney, Agent, or Firm* — Baker Botts L.L.P.

(57) ABSTRACT

Aggregating customer records to conduct due diligence to facilitate business transaction includes receiving a request to aggregate customer transaction records, wherein the customer transaction records are stored when a customer conducts a transaction with a selected one of a first company and a second company. A plurality of customer transaction records are determined from a first enterprise. The plurality of customer transaction records are aggregated from the first enterprise, wherein the plurality of customer transaction records comprises records associated with the first company and records associated with the second company. The aggregated customer transaction records are communicated in response to the request.

11 Claims, 4 Drawing Sheets

| TRANSACTION ID | CUSTOMER ID | DATE | TXN MODE | MODE IDENTIFIER | COMPANY ID | AMOUNT |
|---|---|---|---|---|---|---|
| 1234 | 5678 | 1-15-2010 | CREDIT | 87654 | COMPANY A | 10.00 |
| 1235 | 5678 | 1-15-2010 | DEBIT | 65432 | COMPANY B | 20.00 |
| 1236 | 5679 | 1-16-2010 | CREDIT | 76543 | COMPANY A | 15.00 |
| ... | ... | ... | ... | ... | ... | ... |

TRANSACTION DATABASE

FIG. 2

AGGREGATION OF CUSTOMER TRANSACTION DATA

TECHNICAL FIELD OF THE INVENTION

This invention relates generally to customer transaction data and, more specifically, to the aggregation of customer transaction data.

BACKGROUND

Before embarking on a business transaction, such as a merger or acquisition, companies perform due diligence analysis of its competitors or target companies. The due diligence analysis is performed to examine operations and management and to verify facts about the competitors or target companies. Currently, the information gathered to accomplish the due diligence is limited to high-level information regarding the competitors or target companies.

SUMMARY OF THE DISCLOSURE

In accordance with the present invention, disadvantages and problems associated with aggregating customer transaction data for due diligence to facilitate business transactions may be reduced or eliminated.

According to one embodiment of the present invention, aggregating customer records to conduct due diligence to facilitate business transaction includes receiving a request to aggregate customer transaction records, wherein the customer transaction records are stored when a customer conducts a transaction with a selected one of a first company and a second company. A plurality of customer transaction records are determined from a first enterprise. The plurality of customer transaction records are aggregated from the first enterprise, wherein the plurality of customer transaction records comprises records associated with the first company and records associated with the second company. The aggregated customer transaction records are communicated in response to the request.

Certain embodiments of the invention may provide one or more technical advantages. A technical advantage of one embodiment includes performing due diligence before a business transaction that considers the data of the customers of the companies involved in the business transaction. The transaction data of the customers may be analyzed according to various attributes to help the companies evaluate the benefits of the business transaction. Another technical advantage of an embodiment provides aggregating actual transaction records of customers to facilitate the analysis rather than relying on third-party information that may be based on survey information rather than on actual records. Using actual transaction data provides accurate insights about various data points, such as projected revenue and projected increase in the number of customers. Yet another technical advantage of an embodiment includes analyzing customer data from one or more companies. If more than one company is analyzed, the data may be compared to determine any overlap of customers between the companies.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 illustrates a particular embodiment of a transaction database that stores customer transaction records;

DETAILED DESCRIPTION OF THE DRAWINGS

Embodiments of the present invention and its advantages are best understood by referring to FIGS. 1 through 4, like numerals being used for like and corresponding parts of the various drawings.

Figure 1:
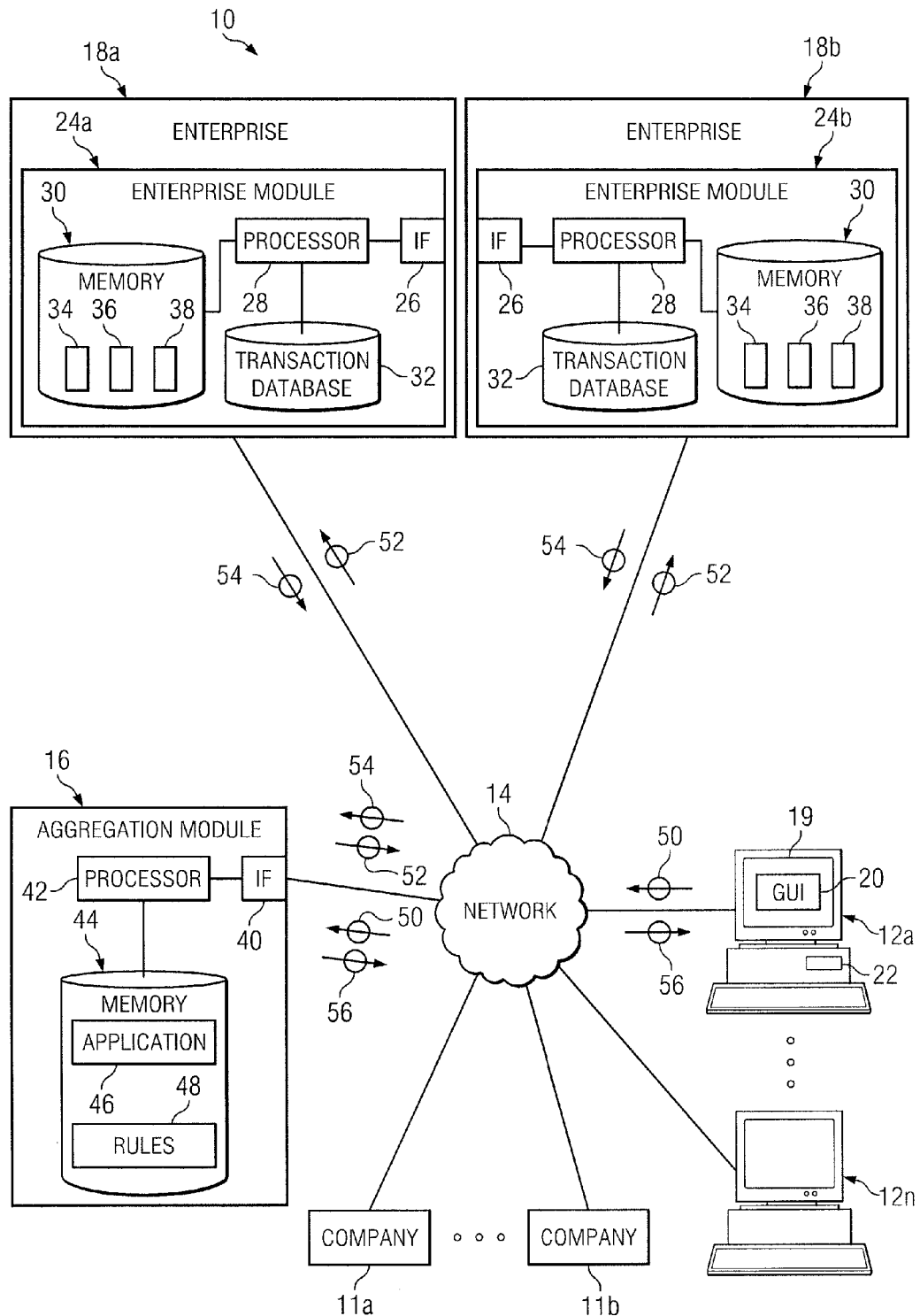
FIG. 1 illustrates a system that aggregates data for due diligence analysis to facilitate business transactions.

FIG. 1 illustrates a system 10 that aggregates data for due diligence analysis to facilitate business transactions. System 10 includes one or more computers 12 that communicate over one or more networks 14 to initiate the aggregation and to receive results from the aggregation. Computer 12 interacts with aggregation module 16 to conduct the aggregation, and aggregation module 16 interacts with enterprises 18 and enterprise modules 24 to receive data related to customers of companies 11.

When conducting business, analysis is continually done to determine a company's financial position, to determine whether to expand the company, or to determine whether to reduce a company's size. For example, when a company participates in a business transaction, such as a merger or acquisition, due diligence is conducted to examine operations, management, and verification of material facts before engaging in the transaction. Typical due diligence analysis does not provide actual information regarding the attributes of customers of a company, which hinders the insights that can be gathered from the data. The teachings of the disclosure recognize that it would be desirable to aggregate actual transaction records of customers to determine customer attributes such as demographics, incomes, expenditures, modes of payment, FICO scores, or other similar attributes to gather beneficial insights for a business transaction.

Company 11 represents an entity in any suitable industry that conducts a transaction with a customer. Company 11 may include a retailer, a wholesaler, a service company, or any other suitable entity that has customers and conducts transactions with the customers. That transaction may include receiving payment for goods or services from the customer or crediting a refund to the customer. Company 11 interacts with enterprise 18 associated with a customer to process each transaction.

System 10 includes computers 12a-12n, where n represents any suitable number, that communicate with aggregation module 16 through network 14. Computer 12 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. A user of computer 12 may request transaction information of customers associated with enterprises 18 by interacting with aggregation module 16. Additionally, a user of computer 12 may receive the aggregated data in any suitable format on computer 12 and processed according to any suitable rules. Computer 12 may also comprise a user interface, such as a display, a microphone, keypad, or other appropriate terminal equipment usable by a user.

In the illustrated embodiment, computer 12 includes a graphical user interface ("GUI") 20 that displays information received from aggregation module 16 to the user. GUI 20 is generally operable to tailor and filter data entered by and presented to the user. GUI 20 may provide the user with an efficient and user-friendly presentation of information. For example, GUI 20 may display the aggregated data in any suitable format such as a bar graph, a pie chart, or a line graph and may display any suitable type of information related to the data. GUI 20 may comprise a plurality of displays having interactive fields, pull-down lists, and buttons operated by the user. GUI 20 may include multiple levels of abstraction including groupings and boundaries. It should be understood that the term GUI 20 may be used in the singular or in the plural to describe one or more GUIs 20 in each of the displays of a particular GUI 20.

Computer 12 also includes an application 22. Application 22 represents any suitable software or logic that allows a user to interact with aggregation module 16 by transmitting requests to and receiving information from aggregation module 16. User 12 may enter access credentials into application 22 to interact with aggregation module 16. The access credentials may include a user name and/or a password.

Network 14 represents any suitable network operable to facilitate communication between the components of system 10 such as companies 11, computers 12, aggregation module 16, enterprises 18, and enterprise modules 24. Network 14 may include any interconnecting system capable of transmitting audio, video, signals, data, messages, or any combination of the preceding. Network 14 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Enterprises 18a and 18b may refer to a financial institution, such as a bank, that communicates with companies 11 to gather transaction information and with computers 12 and aggregation module 16 to provide data for aggregation and analysis. Enterprise 18 gathers data for customers that have a credit card account, a savings account, a debit card account, a checking account, or any other account associated with enterprise 18. Even though enterprise 18 is referred to as a financial institution, enterprise 18 represents any suitable type of entity in any suitable industry that provides data to aggregation module 16 for analysis in an due diligence project. Enterprises 18a and 18b may include one or more enterprise modules 24a and 24b, respectively.

Enterprise modules 24a and 24b represent any suitable components that facilitate the operation of enterprises 18a and 18b, respectively, by facilitating communication with computers 12 and aggregation module 16 and providing customer transaction information to aggregation module 16. Enterprise module 24 may include a network server, any suitable remote server, a mainframe, a host computer, a workstation, a web server, a personal computer, a file server, or any other suitable device operable to communicate with computers 12 and aggregation module 16 and process data. In some embodiments, enterprise module 24 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of enterprise module 24 may be performed by any suitable combination of one or more servers or other components at one or more locations. In the embodiment where the module is a server, the server may be a private server, and the server may be a virtual or physical server. The server may include one or more servers at the same or remote locations. Also enterprise module 24 may include any suitable component that functions as a server. In the illustrated embodiment, enterprise module 24 includes a network interface 26, a processor 28, a memory 30, and a transaction database 32.

Network interface 26 represents any suitable device operable to receive information from network 14, transmit information through network 14, perform processing of information, communicate to other devices, or any combination of the preceding. For example, network interface 26 receives requests for transaction data associated with customers of enterprise 18. As another example, network interface 26 communicates customer transaction data to aggregation module 16. Network interface 26 represents any port or connection, real or virtual, including any suitable hardware and/or software, including protocol conversion and data processing capabilities, to communicate through a LAN, WAN, or other communication system that allows enterprise module 24 to exchange information with network 14, companies 11, computers 12, other enterprises 18, other enterprise modules 24, aggregation module 16, or other components of system 10.

Processor 28 communicatively couples to network interface 26, memory 30, and transaction database 32, and controls the operation and administration of enterprise module 24 by processing information received from network interface 26, memory 30, and transaction database 32. Processor 28 includes any hardware and/or software that operates to control and process information. For example, processor 28 executes management software 34 to control the operation of enterprise module 24. Processor 28 may be a programmable logic device, a microcontroller, a microprocessor, any suitable processing device, or any suitable combination of the preceding.

Memory 30 stores, either permanently or temporarily, data, operational software, or other information for processor 28. Memory 30 includes any one or a combination of volatile or non-volatile local or remote devices suitable for storing information. For example, memory 30 may include random access memory (RAM), read only memory (ROM), magnetic storage devices, optical storage devices, or any other suitable information storage device or a combination of these devices. While illustrated as including particular modules, memory 30 may include any suitable information for use in the operation of enterprise module 24.

In the illustrated embodiment, memory 30 includes management software 34, management data 36, and accounts data 38. Management software 34 represents any suitable set of instructions, logic, or code embodied in a computer-readable storage medium and operable to facilitate the operation of enterprise module 24. Management data 36 includes any suitable information regarding management of enterprise 18. For example, management data 36 may include information regarding the management of a website associated with enterprise 18, rules regarding a user accessing account information, data regarding authentication, any other information regarding the management of enterprise 18, or any suitable combination of the preceding. Accounts data 38 represents any information regarding accounts handled by enterprise 18. For example, accounts data 38 includes account numbers, nicknames for accounts, account identifiers associated with an account, balance information of an account, limits of an account, disclaimers associated with an account, customer preferences, any other suitable data, or any suitable combination of the preceding.

Transaction database 32 stores, either permanently or temporarily, transaction records for customers of enterprise 18. Customers that have accounts with enterprise 18 conduct transactions with companies 11 and the transaction records are stored in transaction database 32. Transaction database 32 includes any one or a combination of volatile or non-volatile local or remote devices suitable for storing information. For example, transaction database 32 may include RAM, ROM, magnetic storage devices, optical storage devices, or any other suitable information storage device or combination of these devices. Transaction database 32 will be described in greater detail in FIG. 2.

Aggregation module 16 represents any suitable component that facilitates the aggregation of customer data received from enterprise 18 and communicates the aggregated data to a user of computer 12 for additional analysis. Aggregation module 16 may include a network server, any suitable remote server, a file server, or any other suitable device operable to communicate with computers 12 and enterprises 18 and aggregate and process customer transaction data. In some embodiments, aggregation module 16 may execute any suitable operating system such as IBM's, z/OS, MS-DOS, PC-DOS, MAC-OS, WINDOWS, UNIX, OpenVMS, or any other appropriate operating system, including future operating systems. The functions of aggregation module 16 may be performed by any suitable combination of one or more servers or other components at one or more locations. In the embodiment where the modules are servers, the servers may be public or private servers, and each server may be a virtual or physical server. The server may include one or more servers at the same or at remote locations. Also, aggregation module 16 may include any suitable component that functions as a server. In the illustrated embodiment, aggregation module 16 includes a network interface 40, a processor 42, and a memory 44.

Network interface 40 represents any suitable device operable to receive information from network 14, transmit information through network 14, perform suitable processing of the customer transaction data, communicate to other devices, or any combination of the preceding. For example, network interface 40 receives requests from computer 12 to gather transaction data related to customers of an enterprise 18 and process the data. The processed data may be used in a due diligence project related to a business transaction. Network interface 40 represents any port or connection, real or virtual, including any suitable hardware and/or software, including protocol conversion and data processing capabilities, to communicate through a LAN, WAN, or other communication system that allows aggregation module 16 to exchange information with network 14, computers 12, other enterprises 18, or other components of system 10.

Processor 42 communicatively couples to network interface 40 and memory 44, and controls the operation and administration of aggregation module 16 by processing information received from network interface 40 and memory 44. Processor 42 includes any hardware and/or software that operates to control and process information. For example, processor 42 executes application 46 to control the operation of aggregation module 16. Processor 42 may be a programmable logic device, a microcontroller, a microprocessor, any suitable processing device, or any suitable combination of the preceding.

Memory 44 stores, either permanently or temporarily, data, operational software, or other information for processor 42. Memory 44 includes any one or a combination of volatile or non-volatile local or remote devices suitable for storing information. For example, memory 44 may include RAM, ROM, magnetic storage devices, optical storage devices, or any other suitable information storage device or a combination of these devices. While illustrated as including particular modules, memory 44 may include any suitable information for use in the operation of aggregation module 16.

In the illustrated embodiment, memory 44 includes application 46 and rules 48. Application 46 generally refers to logic, rules, algorithms, code, tables, and/or other suitable instructions for performing the described functions and operations of aggregation module 16. In an embodiment, application 46 represents software that is generally available, such as SPOTFIRE®. Application 46 facilitates the interaction of aggregation module 16 with enterprise module 24 and, more specifically, with transaction database 32 to aggregate customer transaction data. Rules 48 generally refer to logic, rules, standards, policies, limitations, tables, and/or other suitable instructions for processing the received customer data from transaction database 32. Rules 48 may include logic to process the aggregated data to determine projections of future revenue, future behavior of customers, economic effects on customer behavior, expected growth of the economy, or other suitable logic to process the aggregation of data.

In an exemplary embodiment of operation, a customer pays for a transaction at company 11a using a credit card associated with enterprise 18a. Company 11a interacts with enterprise 18a to process the payment and to receive funds for the transaction. Enterprise 18a collects information for each transaction conducted by the customer of enterprise 18a. The same process occurs for customers of enterprise 18b. Because enterprises 18 collect information regarding transactions involving companies 11, a user may request an aggregation of data to facilitate analysis and due diligence involving business transactions between companies 11.

A user interacts with computer 12a to request aggregation and processing of customer data related to companies 11. Using application 22, the user enters a request 50 on GUI 20. Request 50 may include a request for data from one or more companies 11 and may include parameters to limit the request. For example, request 50 may be limited by time period. Request 50 may also include criteria for the search, or request 50 may include the criteria in which to format the results.

Aggregation module 16 receives request 50 and interacts with enterprise 18 and the associated enterprise module 24 to determine customer records related to request 50. In an embodiment, aggregation module 16 communicates request 52 to enterprises 18a and 18b to determine transaction records of customers associated with each company 11. Request 52 may represent request 50 in a format understandable by enterprise module 24. By gathering data from both enterprises 18, aggregation module 16 is able to aggregate data from one or more companies 11, provide additional data points, and determine an overlap of customers between companies 11.

Aggregation module 16 receives requested data 54 from enterprise modules 24a and 24b. Aggregation module 16 processes requested data according to rules 48. Aggregation module 16 may process the customer data into a particular format to present to the user. Aggregation module 16 communicates the organized data to computer 12, and computer 12 presents the information to the user on display 19.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, aggregation module 16 may consolidate information from any suitable number of enterprises 18 and process the consolidated information for presentation to a user. As another example, enterprises 18 may include aggregation module 16. Additionally, system 10 may include any number of computers 12, networks 14, enterprises 18, and aggregation module 16. Any suitable logic may perform the functions of system 10 and the components within system 10.

FIG. 2 illustrates a particular embodiment of a transaction database 32 that stores customer transaction records. In an embodiment, transaction database 32 represents a proprietary Bank of America database, Transaction History Opportunistic Repository, that stores transactions for Bank of America customers.

Transaction database 32 may be stored in enterprise module 24 or may be stored in an external network storage device. Transaction database 32 stores each transaction of a customer that has an account with enterprise 18. Customers that have a credit card account, a checking account, a savings account, a debit card account, or other account may have transactions stored within transaction database 32. The transactions may be stored in an organized manner within transaction database 32. In an embodiment, transaction database 32 is organized by transaction records 114. Each transaction record 114 may have any suitable number of fields to represent the transaction.

In certain embodiments, transaction record 114 may include the following fields: transaction identifier field 100, customer identifier field 102, date field 104, transaction mode field 106, mode identifier field 108, company identifier field 110, and amount field 112. Transaction identifier field 100 represents an identifier of a particular transaction. The transaction may be with any suitable company 11. Customer identifier field 102 represents a unique or non-unique identifier of a customer. Date field 104 represents the date in which the transaction occurred. Transaction mode field 106 represents the method of payment for the transaction. For example, transaction mode field 106 may include a reference to a credit card, a debit card, or a checking account. Mode identifier field 108 represents a sequence of numbers that identifies the mode of payment. For example, if transaction mode field 106 includes credit, mode identifier field 108 may include the specific credit card number. The value in company identifier field 110 represents an identifier of company 11. Amount field 112 includes the amount of the transaction. Each field is included for each transaction record 114 in transaction database 32.

When interacting with transaction database 32, aggregation module 16 may pull portions of each relevant transaction record 114 to aggregate. For example, if aggregation module 16 collects data related to the mode of payment for customer transactions at Company A, aggregation module 16 may collect information only from transaction mode field 106 and company identifier field 110, rather than extract the entire transaction record 114 for aggregation. Aggregation module 16 may determine the fields to collect based on the received request, or a user may input in the request the fields to collect from transaction database 32.

Transaction database 32 has a plurality of transaction records 114 that represent each transaction that has taken place with company 11. A plurality of transaction records 114 may be organized into folders according to any suitable criteria. For example, transaction records 114 are organized into folders for each day, each week, or each month.

Modifications, additions, or omissions may be made to transaction database 32. For example, transaction database 32 may include transactions from any suitable number of enterprises 18. As another example, transaction database 32 may represent a sample of a universal database. This sample provides a broad cross section of the transactions. As yet another example, any suitable component within system 10 may include transaction database 32. For example, company 11 may include transaction database 32 for transactions occurring at company 11.

Figure 3:
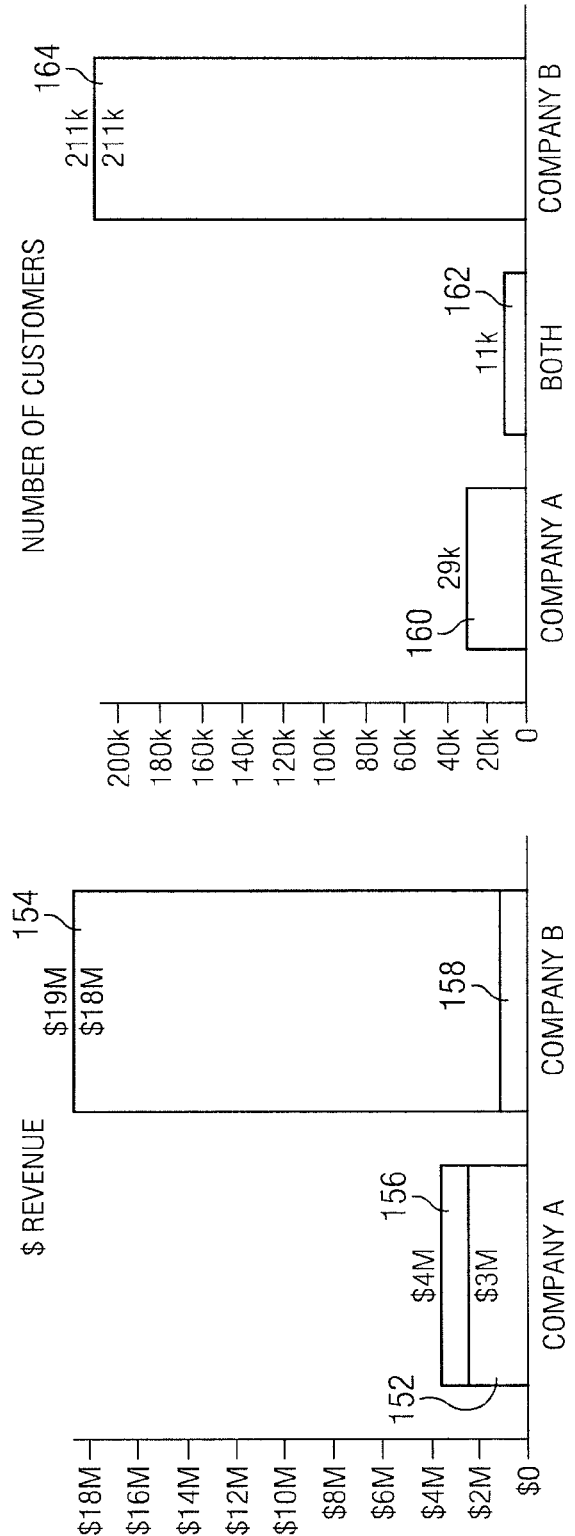
FIG. 3 illustrates an example screenshot for requesting the aggregation of data and displaying results of the aggregated data.

FIG. 3 illustrates an example screenshot 150 for requesting aggregation of the data and displaying results of the aggregated data.

Screenshot 150 may be one embodiment of a user interface in which a user views the results of the aggregation and processing of the customer transaction data received from aggregation module 16. The example screenshot 150 illustrates revenue generated by Company A and Company B for analysis.

Graph 151 illustrates the revenue generated by customers that shop at either Company A or Company B and illustrates the revenue generated by customers that shop at both Company A and Company B. Bar 152 represents the revenue generated by customers that shop only at Company A. In the illustrated embodiment, the revenue is $3M. Bar 154 represents the revenue generated by customers that shop only at Company B. In the illustrated embodiment, the revenue is $18M. Bar 156 represents the revenue generated by Company A from customers that shop at both Company A and Company B. In the illustrated embodiment, the revenue is $1M. Bar 158 represents the revenue generated by Company B from customers that shop at both Company A and Company B. In the illustrated embodiment, the revenue is $1M.

Graph 159 represents the number of customers that shop at either Company A, Company B, or both. Bar 160 represents the number of customers that shop only at Company A. In the illustrated embodiment, 29,000 customers shop only at Company A. Bar 162 represents the number of customers that shop at both Company A and Company B. In the illustrated embodiment, 11,000 customers shop at both Companies A and B. Bar 164 represents the number of customers that shop at only Company B. In the illustrated embodiment, 211,000 customers shop only at Company B.

When requesting the analysis, the user may specify how the results should appear. For example, to receive this screenshot 150, the user may have specified that the analysis determine the revenue of each company 11 and determine the overlap in revenue and customer base of companies 11. As another example, the user may request a result that depicts the revenue company 11 organized by the amount of each transaction. The result may also reflect the income of customers of companies 11. As noted above, the user may request that the results be displayed in any suitable format, such as a bar graph, a pie graph, or a line chart. The user may also request that any suitable analysis be done on the customer data to provide the information in a screenshot.

The information presented in graphs 151 and 159 allows a user to analyze the aggregated results. For example, if Company B desires to acquire Company A, a user may request the aggregated results and analyze graph 151 to determine the revenue impact on Company B of acquiring Company A. Based on the information in the illustrated embodiment, Company B may increase revenue by $3M if all customers that previously shopped at only Company A begin to shop at Company B after Company B acquires Company A. A user may analyze graph 159 to determine the increase in customer base of Company B after acquiring Company A. Based on the information in the illustrated embodiment, the customer base of Company B may increase by 29,000 by acquiring Company A. The user may request that the aggregated results be presented in a number of different ways to facilitate the analysis and due diligence.

When requesting customer transaction data from aggregation module 16, the user may input particular criteria in request 50 in which the result is displayed on display 19. For example, aggregation module 16 may aggregate the data according to customer demographics, customer FICO scores, ticket size of each transaction, an average of the number of transactions per customer in a predefined period, mode of payment, geography of customers, or any other suitable criteria. The results may also indicate the income of customers for a user to determine the purchasing capacity of a customer. A user may conduct appropriate analysis of the data and due diligence to facilitate a business transaction.

Figure 4:
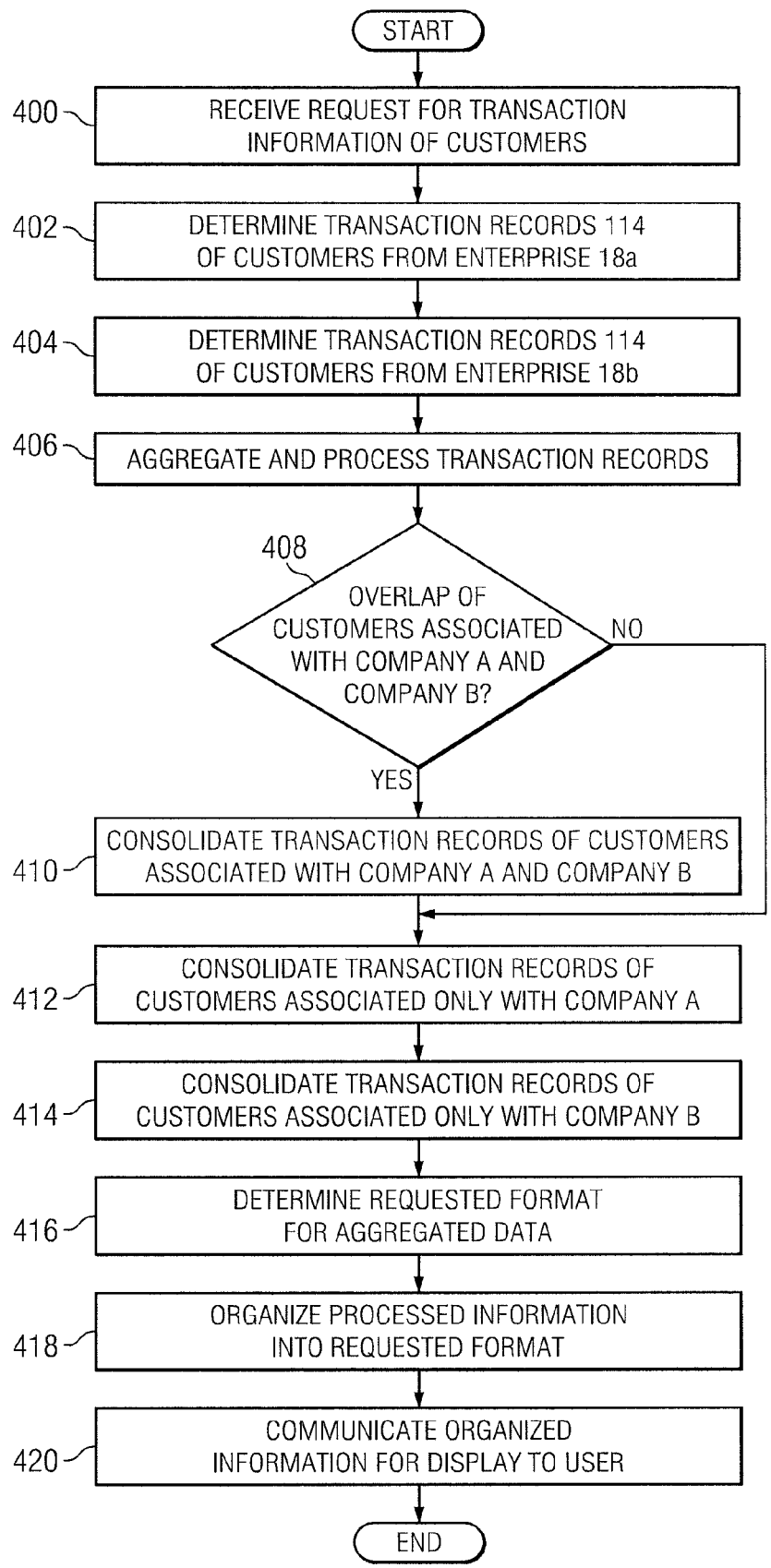
FIG. 4 illustrates a flowchart for aggregating transaction records of customers.

FIG. 4 illustrates a flowchart for aggregating and analyzing transaction records of customers. The method begins in step 400 where aggregation module 16 receives a request for transaction information of customers. The customers have an account with enterprise 18 for enterprise 18 to collect data regarding transactions. In an embodiment, aggregation module 16 determines the criteria defined in the request. Determining the criteria facilitates the determination of transaction records 114 to collect from each enterprise 18. The criteria may also allow aggregation module 16 to pull a portion of information from each transaction record 114 that meets the criteria. For example, if the user requests an aggregation of revenue information for Company A and Company B, aggregation module 16 may only pull data from customer identifier field 102, company identifier field 110, and amount identifier field 112 to aggregate revenue information for each company.

At step 402, aggregation module 16 determines transaction records 114 of customers from enterprise 18a. Aggregation module 16 also communicates with second enterprise 18b to determine transaction records 114 of customers from enterprise 18b at step 404. The transaction records 114 collected from enterprise 18a and 18b may be associated with any one or more companies 11 at which the customer shops.

Upon receiving transaction records 114 from enterprises 18a and 18b, aggregation module 16 aggregates the data from transaction records 114 and processes the data according to rules 48 at step 406. While aggregating transaction records 114, aggregation module 16 determines at step 408 whether there is an overlap of customers based on the criteria in the request. For example, if the customer shops at both Company A and Company B, that customer would represent an overlap between companies 11. If there is an overlap, at step 410, aggregation module 16 consolidates transaction records 114 of customers associated with Company A and Company B. Upon consolidating transaction records 114 associated with the overlap of customers, the method proceeds to step 412.

If there is not an overlap of customers, the method continues directly to step 412 where aggregation module 16 consolidates transaction records 114 of customers associated with Company A. These customers only shop at Company A. At step 414, aggregation module 16 consolidates transaction records 114 of customers associated only with Company B. These customers only shop at Company B. Aggregation module 16 may apply rules 48 to the aggregated data to provide additional information to the user. For example, rules 48 may predict expected customer behavior, expected economic trends, expected company growth, or other suitable predictions or forecasts based on the aggregated data.

After having processed transaction records 114, aggregation module 16 determines the requested format in which to present the information at step 416. Aggregation module 16 organizes the process and information into the requested format at step 418, and communicates the organized information for display to the user at step 420. The user may use the organized information in the analysis for due diligence projects in business transactions. The user may also request additional information regarding transaction records 114, different information regarding transactions records 114, or any other suitable information regarding transaction records 114 and the customer data.

Modifications, additions, or omissions may be made to the flowchart. For example, a user may request transaction information for one company and aggregation module 16 does not determine whether an overlap of customers exists. Additionally, steps in FIG. 4 may be performed in parallel or in any suitable order.

Certain embodiments of the invention may provide one or more technical advantages. A technical advantage of one embodiment includes performing due diligence before a business transaction that considers the data of the customers of the companies involved in the business transaction. The transaction data of the customers may be analyzed according to various attributes to help the companies evaluate the benefits of the business transaction. Another technical advantage of an embodiment provides aggregating actual transaction records of customers to facilitate the analysis rather than relying on third-party information that may be based on survey information rather than on actual records. Using actual transaction data provides accurate insights about various data points, such as projected revenue and projected increase in the number of customers. Yet another technical advantage of an embodiment includes analyzing customer data from one or more companies. If more than one company is analyzed, the data may be compared to determine any overlap of customers between the companies.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for aggregating customer records to conduct due diligence to facilitate business transaction, comprising:
    receiving a request to aggregate customer transaction records, wherein the customer transaction records are stored in a transaction database when a customer conducts a transaction with a selected one of a first company and a second company;
    determining, at a processor, a first plurality of customer transaction records from a first enterprise;

aggregating, by the processor, the first plurality of customer transaction records from the first enterprise, wherein the first plurality of customer transaction records from the first enterprise comprises records associated with the first company and records associated with the second company;

determining a second plurality of customer transaction records from a second enterprise, wherein the second plurality of customer transaction records from the second enterprise comprises records associated with the first company and records associated with the second company;

aggregating the second plurality of customer transaction records from the second enterprise with the first plurality of customer transaction records from the first enterprise;

determining an overlap of customers between the first company and the second company;

determining a third plurality of customer transaction records associated with the overlap of customers;

processing, at a processor, the aggregated first and second pluralities of customer transaction records according to rules to determine a forecast of revenue associated with the business transaction, wherein the forecast of revenue consolidates the third plurality of customer transaction records to prevent duplicating revenue in the forecast of revenue; and communicating the aggregated first and second pluralities of customer transaction records for display in response to the request, wherein the display identifies revenue associated with the first company, revenue associated with the second company, and revenue associated with the overlap of customers.

2. The method of claim 1, wherein the request comprises criteria to facilitate the aggregation of transactions records.

3. The method of claim 1, wherein each transaction record comprises a plurality of fields to identify the transaction and further comprising determining one or more fields from which to collect data based on criteria included within the request.

4. The method of claim 3, wherein aggregating the plurality of customer transaction records comprises aggregating data from the determined one or more fields.

5. Tangible computer readable storage medium comprising logic, the logic operable, when executed by a processor, to:
receive a request to aggregate customer transaction records, wherein the customer transaction records are stored in a transaction database when a customer conducts a transaction with a selected one of a first company and a second company;
determine a first plurality of customer transaction records from a first enterprise;
aggregate the first plurality of customer transaction records from the first enterprise, wherein the first plurality of customer transaction records from the first enterprise comprises records associated with the first company and records associated with the second company;
determine a second plurality of customer transaction records from a second enterprise, wherein the second plurality of customer transaction records from the second enterprise comprises records associated with the first company and records associated with the second company;
aggregate the second plurality of customer transaction records from the second enterprise with the first plurality of customer transaction records from the first enterprise;
determine an overlap of customers between the first company and the second company;
determine a third plurality of customer transaction records associated with the overlap of customers;
process the aggregated first and second pluralities of customer transaction records according to rules to determine a forecast of revenue associated with the business transaction, wherein the forecast of revenue consolidates the third plurality of customer transaction records to prevent duplicating revenue in the forecast of revenue; and
communicate the aggregated first and second pluralities of customer transaction records for display in response to the request, wherein the display identifies revenue associated with the first company, revenue associated with the second company, and revenue associated with the overlap of customers.

6. The computer readable medium of claim 5, wherein the request comprises criteria to facilitate the aggregation of transactions records.

7. The computer readable medium of claim 5, wherein each transaction record comprises a plurality of fields to identify the transaction and further comprising determining one or more fields from which to collect data based on criteria included within the request.

8. The computer readable medium of claim 7, wherein aggregating the plurality of customer transaction records comprises aggregating data from the determined one or more fields.

9. A module for aggregating customer records to conduct due diligence to facilitate business transaction, comprising:
a network interface operable to receive a request to aggregate customer transaction records, wherein the customer transaction records are stored in a transaction database when a customer conducts a transaction with a selected one of a first company and a second company;
a memory operable to store rules to facilitate the aggregation of the customer transaction records; and
a processor communicatively coupled to the network interface and the memory and operable to:
determine a first plurality of customer transaction records from a first enterprise;
aggregate the first plurality of customer transaction records from the first enterprise, wherein the first plurality of customer transaction records from the first enterprise comprises records associated with the first company and records associated with the second company;
determine a second plurality of customer transaction records from a second enterprise, wherein the second plurality of customer transaction records from the second enterprise comprises records associated with the first company and records associated with the second company;
aggregate the second plurality of customer transaction records from the second enterprise with the first plurality of customer transaction records from the first enterprise;
determine an overlap of customers between the first company and the second company;
determine a third plurality of customer transaction records associated with the overlap of customers; and
process the aggregated first and second pluralities of customer transaction records according to rules to determine a forecast of revenue associated with the business transaction, wherein the forecast of revenue consolidates the third plurality of customer transaction records to prevent duplicating revenue in the forecast of revenue and wherein the network interface communicates the aggregated first and second pluralities of customer transaction records for display in response to the request, wherein the display identifies revenue associated with the first company, revenue associated with the second company, and revenue associated with the overlap of customers.

10. The module of claim 9, wherein the request comprises criteria to facilitate the aggregation of transactions records.

11. The module of claim 9, wherein each transaction record comprises a plurality of fields to identify the transaction and further comprising determining one or more fields from which to collect data based on criteria included within the request.

* * * * *